(12) United States Patent
Akimoto et al.

(10) Patent No.: US 6,730,248 B2
(45) Date of Patent: May 4, 2004

(54) FOAMED ARTICLE OF THERMOPLASTIC RESIN COMPOSITION AND PROCESS FOR PRODUCING IT

(75) Inventors: Hideo Akimoto, Sodegaura (JP); Mitsuru Watari, Sodegaura (JP); Takashi Miyazaki, Sodegaura (JP); Tatsuji Kawamura, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 167 days.

(21) Appl. No.: 09/988,596

(22) Filed: Nov. 20, 2001

(65) Prior Publication Data
US 2003/0017325 A1 Jan. 23, 2003

(30) Foreign Application Priority Data
Jul. 5, 2001 (JP) ........................................ 2001-205031

(51) Int. Cl.$^7$ .............................................. B29C 44/02
(52) U.S. Cl. ............................ 264/51; 264/54; 264/321; 264/328.7
(58) Field of Search ............................ 264/321, 51, 54, 264/328.7

(56) References Cited

U.S. PATENT DOCUMENTS

| | | | | |
|---|---|---|---|---|
| 3,793,415 A | * | 2/1974 | Smith | 264/328.7 |
| 3,809,733 A | * | 5/1974 | Sandiford et al. | 264/328.7 |
| 3,825,637 A | * | 7/1974 | Robin | 264/328.7 |
| 4,274,637 A | * | 6/1981 | Molitor | 264/54 |
| 4,783,292 A | | 11/1988 | Rogers | |
| 5,252,269 A | * | 10/1993 | Hara et al. | 264/45.3 |
| 5,281,376 A | * | 1/1994 | Hara et al. | 264/46.4 |
| 5,362,226 A | * | 11/1994 | Kataoka et al. | 425/526 |
| 6,010,656 A | | 1/2000 | Nomura et al. | |

FOREIGN PATENT DOCUMENTS

EP    0 481 306 A1    4/1992

* cited by examiner

Primary Examiner—Allan R. Kuhns
(74) Attorney, Agent, or Firm—Burns, Doane, Swecker & Mathis, LLP

(57) ABSTRACT

A process is provided for producing a foamed article of a thermoplastic resin composition having a relatively thicker solid skin layer exhibiting better appearance without occurrence of a swirl mark and having a foam structure of relatively uniform foam cell size with better foam cell configuration, which is light-weighing and superior in stiffness, in an easy and efficient manner, by causing the resin composition to foam up in a cavity of a mold.

10 Claims, 1 Drawing Sheet

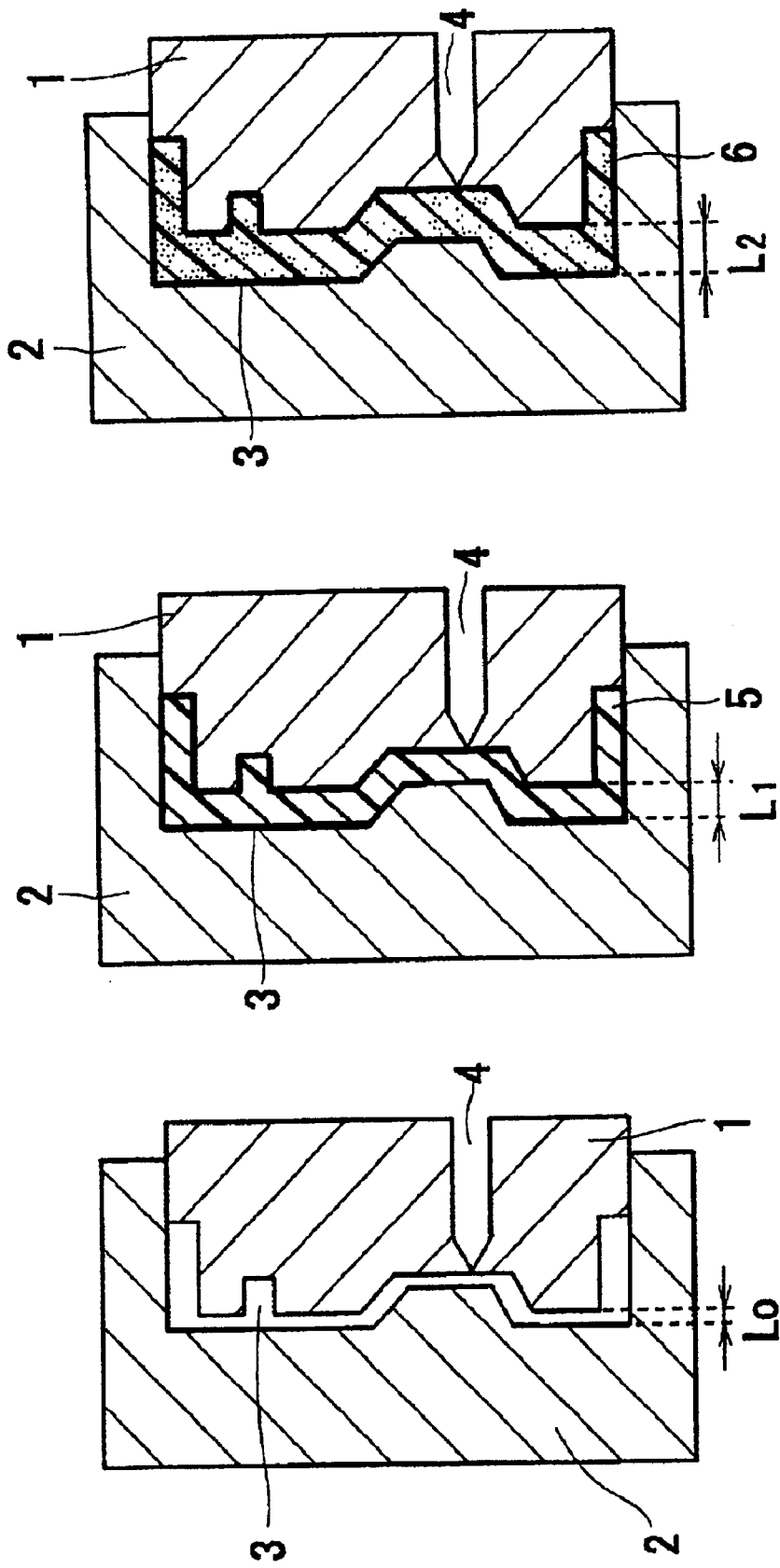

FOAMED ARTICLE OF THERMOPLASTIC RESIN COMPOSITION AND PROCESS FOR PRODUCING IT

FIELD OF THE INVENTION

The present invention relates to a foamed article having a solid skin layer and a core part both made of single thermoplastic resin composition and to a process for producing such foamed article.

BACKGROUND OF THE INVENTION

Thermoplastic resins, in particular, polyolefin resins have found wide applications in industry. Since polyolefin resins has no content of chlorine, they do not emit noxious gases on incineration. The extent of application thereof has rapidly been developed as environment-favoring materials, since they permit also recycled use. In particular, in the field of automotive industry, there have been a demand for parts made of a polyolefin resin which are light-weighing and are superior in the stiffness and so on.

Injection molded foamed articles, which are produced by injection-molding such a polyolefin resin while causing it simultaneously to foam up, have been in practical use as the polyolefin resin products. In general, a foamed article produced by injection-molding a polyolefin resin composition containing a foaming agent with simultaneous foaming is inferior in the appearance and in the strength and has lower commercial value as compared with molded article without foaming, since foam cells are found also within the surface layer of the foamed article.

Therefore, it has been practised, in an application field, for example, automotive parts, in which greater importance is placed on seeking for better appearance, to provide the foamed article with a skin layer, by covering the inner face of the cavity of foaming mold with a skin layer prepared preliminarily in a separate process step and, then, injecting the molten foaming resin composition thereinto, in order to build up a foamed article covered with the skin layer, or by applying a skin layer onto the injection molded foamed article.

However, the conventional practice given above has problems that the procedures are complicate and that the spent or wasted articles are difficultly brought into recycled use, as the skin layer and the core part of the foamed product are made of different resins.

For solving these problems, a technique has been proposed in which a solid skin layer is formed on the external face of the foamed molded article at the same time with the molding of the foamed article.

For example, Japanease Patent Kokai Hei 4-144721 A discloses a technique in which a molten resin is injected into a metal mold while receding the mold. This prior technique has some problems that the molten resin can hardly be filled fully up to peripheral portions of the mold cavity with a trend of easy occurrence of short shot, therefore thicker skin layer is difficult to obtain and the distribution of sizes of foam cells became rough.

Japanese Patent Kokai Hei 4-214311 A discloses a technique in which a molten resin is injected into a metal mold while receding it and, then, the metal mold is moved once to the direction for closing it to form a solid skin layer, whereupon foaming is effected under recession of the metal mold. However, this prior technique has problems in that wavy flow marks (in the following referred to sometimes as swirl marks) may be apt to occur on the surface of the foamed article and that the process steps are intricate and require extended process cycles. When flow marks, such as the swirl marks, are formed on the surface of the foamed article, the appearance of the article is debased, prohibiting thus use of such an article for a non-coated article, such as those recently found uses for the interior and exterior furnishings of automobile.

Japanese Patent Kokai Hei 8-300391 A describes a technique in which a molten resin is injected into a metal mold held in a fixed state and the mold is then cooled in the state as such, whereupon foaming is effected while receding the metal mold. However, this prior technique has problems in that the foam cells formed are irregular in sizes resulting in an inferior heat insulation and lower mechanical strength, that the process requires prolonged procedures and that swirl marks due to flow of the molten resin on the surface of the foamed article are not able to exclude.

Japanese Patent Kokai Hei 10-128795 A described a technique in which a molten resin is injected into a metal mold in a fixed state of the mold to fill up it, whereupon foaming is effected at once while receding the metal mold. However, this prior technique has some problems in that some reduction in the foaming expansion ratio should be endured, when it is attempted to increase the solid skin layer thickness, and vice versa.

Starting from the stand of the technique as given above, the inventors reached a solution in which a part of the raw material is first injected into a restricted cavity of the metal mold, whereupon the remaining part of the raw material is injected into the cavity while relieving the restriction of cavity space. By this technical measure, it has now been made possible to produce a molded foamed article having a thicker solid skin layer with a high foaming expansion ratio.

The present invention further provides a technique in which occurrence of flow marks, such as swirl mark and so on, can be excluded, whereby foamed articles capable of serving for non-coated articles as, for example, automobile interior and exterior parts can be produced.

SUMMARY OF THE INVENTION

The first object of the present invention is to provide a process for producing a light-weight foamed article of superior stiffness from a thermoplastic resin composition in an easy and efficient manner, wherein the said foamed article has a solid skin layer made of the same thermoplastic resin composition as that of its core part and the sizes of the foam cells are relatively uniform with better cell configuration.

The second object of the present invention is to provide a process in which a foamed article made of a thermoplastic resin composition and having a solid skin layer of relatively greater thickness can be produced at a higher foaming expansion ratio in an easy and efficient manner.

The third object of the present invention is to provide a process which can afford to produce a foamed article made of a thermoplastic resin composition in an easy and efficient manner, in which a solid skin layer having no flow mark, such as swirl mark, and, thus, providing better appearance can be formed easily.

The above objects are attained by the present invention which consists in a process for producing a foamed article of a thermoplastic resin composition and in a foamed article produced by such process as given in the following:

(1) A process for producing a foamed article of a thermoplastic resin composition by causing the said resin composition to foam up in a cavity of a mold, comprising a primary injection step in which a part amount of the thermoplastic resin composition is injected into the mold cavity defined by a stationary mold element and a movable mold element settled at a position confining the mold cavity to a smaller volume than the total volume of the thermoplastic resin composition necessary for making up the complete foamed article, while imposing a clamping pressure on the movable mold element so as to settle it at the said position, a secondary injection step subsequent to the primary injection step, in which the residual amount of the thermoplastic resin composition is further injected into the mold cavity, while drawing the movable mold element back from the position settled for the primary injection step so as to increase the cavity volume, and a foaming step subsequent to the secondary injection step, in which injection of the thermoplastic resin composition is stopped and the movable mold element is further drawn back so as to permit the thermoplastic resin composition to foam up, wherein the thickness $L_0$ of the mold cavity at the start of the primary injection step is in the range from 1.0 to 1.5 mm, the injection time of the primary injection step is 1.5 seconds or less and the pressure imposed on the movable mold element in the primary injection step is in the range from 5 to 20 MPa with respect to the sectional area of the mold cavity in the projection onto the mold base plane.

(2) The process as defined in the above (1), wherein the ratio of the thickness $L_0$ of the mold cavity at the start of the primary injection step relative to the thickness $L_1$ at the end of the secondary injection step, namely, $L_0/L_1$, is in the range from 0.3 to 1.0.

(3) The process as defined in the above (1) or (2), wherein the recession of the movable mold element subsequent to the secondary injection step begins within 5 seconds from the termination of the secondary injection step.

(4) The process as defined in any one of the above (1) to (3), which comprises further a step of compressing the foamed article, in which the movable mold element is pressed onto the foamed article within 60 seconds from the termination of the foaming step.

(5) The process as defined in any one of the above (1) to (4), wherein the thermoplastic resin composition comprises a polyolefin resin and a foaming agent.

(6) The process as defined in the above (5), wherein the polyolefin resin is a polypropylene resin.

(7) The process as defined in the above (5) or (6), wherein the polyolefin resin has a melt flow rate, determined according to ASTM D 1238 at 230° C. under a load of 2.16 kg, in the range from 30 to 200 g/10 min.

(8) A foamed article of a thermoplastic resin composition, which is produced by the process as defined in any one of the above (1) to (7).

(9) The foamed article as defined in the above (8), wherein the solid skin layer has a thickness in the range from 0.1 to 0.7 mm.

(10) The foamed article as defined in the above (8) or (9), wherein the foaming expansion ratio is in the range from 1.05 to 5 times of the non-expanded original volume.

(11) Automotive parts as foamed articles, which are produced by the process as defined in any one of the above (1) to (7).

BRIEF DESCRIPTION OF THE DRAWINGS

FIG. 1(a) depicts the course of the production process according to the present invention in a schematic sectional view of the mold, showing the mold in the state before the injection of the thermoplastic resin composition.

FIG. 1(b) depicts the course of the production process according to the present invention also in a schematic sectional view of the mold, showing the mold in the state after the secondary injection step.

FIG. 1(c) depicts the course of the production process according to the present invention also in a schematic sectional view of the mold, showing the mold in the state after the foaming step.

DETAILED DESCRIPTION OF THE INVENTION

There is no special restriction for the thermoplastic resin composition to be processed according to the present invention, so long as it deals with a foamable resin composition comprising a foaming agent and a thermoplastic resin. Concrete examples of the thermoplastic resin to be incorporated as the raw material include polyolefin resins, such as those of polyethylene, polypropylene, poly-1-butene and poly-methylpentene; polyester resins, such as polyethylene terephthalate, polybutylene terephthalate and polyethylene naphthalate; polyamide resins, such as nylon 6, nylon 9, nylon 10, nylon 11, nylon 12, nylon 46, nylon 66, nylon 610, nylon 611 and nylon 612; polyether resins, such as polyoxymethylene, polyphenyl ether and so on; styrene-based polymers, such as polystyrene, ABS resin and AES resin; carbonate-based polymers, such as polycarbonate etc.; and others including polyvinyl chloride and ethylene/polar resin copolymers, such as ethylene/vinyl acetate copolymer, ethylene/(meth)acrylate copolymers and ionomer resins.

As the thermoplastic resin, polyolefin resins may preferably be employed, above all, polyethylene resins and polypropylene resins are favorable in view of the cost performance, mechanical strength and moldability, with special preference to polypropylene resins. For the polyolefin resins, those which have melt flow rates (MFR) in the range from 30 to 200 g/10 min., preferably from 60 to 120 g/10 min., determined according to ASTM D 1238 at 230° C. under a load of 2.16 kg, are preferred. The thermoplastic resins, such as polypropylene resins, may be employed each individually or in combination of two or more of them.

As the polypropylene resins, there may be used homopolymers of propylene or copolymers of propylene with miner proportions of other α-olefin. For the copolymer, α-olefins having 2–10 carbon atoms, such as ethylene, 1-butene, 1-pentene, 1-hexene, 4-methyl-1-pentene, 1-octene and 1-decene may be incorporated as the comonomer. Such copolymers may be present as random copolymer or block-copolymer. The proportion of such comonomer may be 10 mole % or less, preferably 5 mole % or less.

Among these polypropylene resins, block-copolymer resins based on propylene are favorable in case where the foamed article according to the present invention is served for an interior or exterior furnishing of automobile, since they are superior in the stiffness, mechanical strength and low-temperature impact strength.

The block-copolymer resin based on polypropylene used favorably according to the present invention is a composition comprising a polypropylene homopolymer component constituting an ingredient insoluble in paraxylene at normal temperature (23° C.), a propylene/ethylene random copolymer component constituting an ingredient soluble in paraxylene at normal temperature and further, on requirement, a polyethylene component.

The polypropylene resin may favorably have a melt flow rate (MFR) in the range from 30 to 200 g/10 min., preferably from 60 to 120 g/10 min., as determined according to ASTM D 1238 at 230° C. under a load of 2.16 kg. When the MFR value is in the above range, a foamed article which is more superior in the appearance due to suppression of occurrence of flow marks, such as swirl mark etc., can be obtained. Those which have densities in the range from 0.890 to 0.920 g/cm$^3$, preferably from 0.900 to 0.910 g/cm$^3$, are favorable.

The polypropylene resin may favorably have an isotactic pentad fraction (mmmm fraction) of 97% or higher, preferably 97.5% or higher, as determined by means of $^{13}$C-NMR. When the isotactic pentad fraction (mmmm fraction) is higher, a foamed article having higher stiffness with higher crystallinity of the resin can be obtained.

The isotactic pentad fraction (mmmm fraction) represents the proportion of the isotactic chains as pentad units present in the molecular chain of the thermoplastic resin and corresponds to the proportion of number of propylene monomer units present at each center of the sequences of five propylene units bound successively with each other by meso-coupling relative to the total number of monomer units in the molecule. In the practice, it is determined by calculating the proportion of mmmm pentad peak in the $^{13}$C-NMR spectrum relative to the total absorbance peak in the methyl carbon region.

The polypropylene resin may contain an olefinic branched polymer in a proportion of 0.1% by weight or less, preferably 0.05% by weight or less. When an olefinic branched polymer is incorporated, it functions as nucleating agent for the polymerization of propylene and, thus, the isotactic pentad fraction is increased and the moldability of the resulting resin can thereby be improved. As the olefinic branched polymer, homopolymers and copolymers, such as 3-methyl-1-butene, 3,3-dimethyl-1-butene, 3-methyl-1-pentene, 4-methyl-1-pentene and 3-methyl-1-pentene, may be employed. Among them, preference is given to a polymer of 3-methyl-1-butene.

The polypropylene resin can be produced by a known technique using a known catalyst. It can be produced, for example, by carrying out, in a voluntary sequence, a process step of polymerizing propylene in the presence of a catalyst system comprising a solid titanium catalyst component (A) containing magnesium, titanium, a halogen and an electron donor, an organoaluminum compound (B) and an electron donor (C) to produce a thermoplastic resin component and a process step of copolymerizing ethylene with an α-olefin having 3–20 carbon atoms to produce an ethylene/α-olefin copolymer. The polymerization can be realized, for example, by gas-phase polymerization, solution polymerization or slurry polymerization.

The solid titanium catalyst component (A) can be prepared by bringing a tetravalent titanium compound, such as a titanium tetrahalogenide, titanium alkoxyhalogenide or titanium tetraalkoxide, into contact with at least one electron donor, selected from the group consisting of oxygen- and nytrogen-containing compounds, such as alcohols, phenols, ketones, aldehydes, esters, ethers, amines, nitrites and acids, and with a halogen-containing magnesium compound.

For the organoaluminum compound (B), one or more selected adaptively among trialkylaluminums, alkylaluminum halogenides, alkylalkoxyaluminums, alkoxy-aluminum halogenides and so on may be employed.

As the electron donor (C), alkoxysilanes, polyethers and so on may be used.

The thermoplastic resin composition to be used according to the present invention may contain, within the range not obstructing the purpose of the present invention, various resins, elastomers, inorganic fillers, additives and so on.

As the inorganic filler, there may be recited, for example, talc, silica, mica, calcium carbonate, glass fiber, glass bead, barium sulfate, magnesium hydroxide, wollastonite, calcium silicate fiber, carbon fiber, magnesium oxysulfate fiber, potassium titanate fiber, titanium oxide, calcium sulfite, white carbon, clays and calcium sulfate. These inorganic fillers may be incorporated either alone or in a combination of two or more of them.

As the additives, there may be recited known additives, for example, nucleating agents, antioxidants, hydrochloric acid absorbers, heat stabilizers, antiweathering agents, photostabilizers, UV-absorbers, slipping agents, anti-blocking agents, antifogging agents, lubricants, antistatic agents, fire retardants, pigments, dyestuffs, dispersants, cupreous injury preventing agents, neutralizing agents, foaming agents, flowability improving agents, such as plasticizer, antifoaming agent, cross-linking agent and peroxide, weld strength improving agents, natural oils, synthetic oils and waxes.

The thermoplastic resin, preferably the polypropylene resin, to be used as a raw material according to the present invention is compounded with a foaming agent for providing a foamability. The foaming agent to be employed according to the present invention may be any known one. The foaming agent may be any one of solvent type, decomposition type or gaseous type.

For the foaming agent of solvent type or gaseous type, every substance which can be absorbed or dissolved in the molten thermoplastic resin in the injection molding apparatus by being introduced into the cylinder of the injection molding apparatus and will vaporize in the mold cavity to form gas bubbles, so as to function as a foaming agent, can be employed. There may be employed, for example, inert gases, such as carbon dioxide gas, nitrogen gas and argon gas; lower boiling aliphatic hydrocarbons, such as propane, butane, neopentane, hexane, isohexane, heptane and isoheptane; and lower boiling fluorine-containing hydrocarbons including flon gases. The gaseous type foaming agent may be introduced into the injection cylinder in a supercritical state.

As the foaming agent of decomposition type, such a compound may be used by being blended preliminarily with the thermoplastic resin, which can, when supplied to the injection molding apparatus, be decomposed at the temperature of the injection cylinder of the molding apparatus to generate a gas component, such as carbon dioxide, nitrogen gas or so on. The decomposition type foaming agent may be of organic or inorganic nature. It is permissible to use concurrently a compound for facilitating gas generation, such as an organic acid or so on.

Concrete examples of the decomposition type foaming agnet include the folowings:

a) inorganic foaming agents, such as sodium bicarbonate, sodium carbonate, ammonium bicarbonate, ammonium carbonate, ammonium nitrite, citric acid and sodium citrate, and b) organic foaming agents, for example, N-nitroso compounds, such as N,N'-dinitrosoterephthalamide and N,N'-dinitrosopentamethylenetetramine; azo compounds, such as azodicarbonamide, azobisisobutyronitrile, azocyclohexylnitrile, azodiaminobenzene and barium azodicarboxylate; sulfonyl hydrazides, such as benzenesulfonyl hydrazide, toluenesulfonyl hydrazide, p,p'-oxy-bis(benzenesulfonyl hydrazide) and diphenylsulfon-3,3'-disulfonyl hydrazide; and azide compounds, such as calcium azide, 4,4'-diphenyldisulfonyl azide and p-toluenesulfonyl azide.

Among them, preference is given to carbonates and bicarbonates, such as sodium carbonate and sodium bicarbonate, and it is favorable to use concurrently a salt of an organic carboxylic acid as a foaming assistant. The proportion of the carbonate or the bicarbonate relative to the organic carboxylic acid salt may favorably be in the range of 80–25 parts by weight, preferably 65–30 parts by weight, of the carbonate or bicarbonate relative to 20–75 parts by weight, preferably 35–70 parts by weight, of the organic carboxylic acid salt, with the total amount of them summing up to 100 parts by weight.

The amount of the foaming agent to be incorporated in the resin composition according to the present invention may favorably be in the range from 0.1 to 6 parts by weight, preferably from 0.5 to 2 parts by weight, per 100 parts by weight of the thermoplastic resin. When the foaming agent is present in the composition within the range given above, formed articles having more uniform foam size can be obtained. The amount of the foaming agent is determined in the practice by taking into account of the amount of the gas evolved, favorable foaming expansion ratio and so on, in accordance with each specific material properties contemplated.

The foamed article of thermoplastic resin composition according to the present invention is produced using the above thermoplastic resin by the process as described below.

The foaming mold to be employed in the process according to the present invention is constituted of a stationary mold element and a movable mold element, of which inside faces are shaped each in a configuration corresponding to that of the foamed article. When the movable mold element is clamped at a position closest to the stationary mold element, a closed mold cavity is built up between the two mold elements with a volume smaller than the full volume of the thermoplastic resin composition necessary for making up the complate molded article. This smallest mold cavity may correspond to the "skin forming space", though it may be greater or smaller than this.

In the process for producing foamed article according to the present invention, a part amount of the thermoplastic resin composition is first injected into the mold cavity defined by the stationary mold element and the movable mold element settled at a position leaving the least cavity thickness $L_0$ in the range from 1.0 to 1.5 mm, preferably from 1.1 to 1.4 mm, with a cavity volume smaller than the full volume of the thermoplastic resin composition necessary for making up the complete molded article, while imposing a clamping pressure thereon to hold it fixedly, in the primary injection step. The injection duration (the time required for filling up the mold cavity with the injected resin composition) may favorably be 1.5 seconds or less, preferably 0.2 to 1.2 seconds. The mold clamping pressure imposed on the movable mold element may favorably be in the range from 5 to 20 MPa, preferably from 7 to 17 MPa, calculated as the sectional area of the mold cavity in projection on the mold base plane. Here, the sectional area of the mold cavity in the projection onto the base plane means the sectional area of the mold cavity projected onto the base plane of the mold vertical to the sliding movement of the movable mold element. As the raw product of the resin, those which have a melt flow rate (MFR), determined according to ASTM D 1238 at 230° C. under a load of 2.16 kg, in the range from 30 to 200 g/10 min., preferably from 60 to 120 g/10 min., may favorably be employed. By effecting the injection of the molten resin composition under the condition as above, the molten resin composition will spread over the entire mold cavity within a brief time while being chilled on the cool inner surfaces of the mold, whereby a dense skin layer of uniform thickness without foam bubbles is built up with better appearance due to absence of a flow mark, such as swirl mark.

When the least thickness $L_0$ of the mold cavity is smaller than the above range, it may be difficult to fill the molten resin to the entire mold cavity up to each peripheral portion with a trend of easy occurrence of short shot. When, on the contrary, the least thickness is greater than the above range, it may be difficult to form a solid skin layer without occurrence of swirl mark on the foamed product.

For the case where the internal gap between the stationary mold element and the movable mold element varies over some extent of the mold cavity, the above least thickness $L_0$ should be defined as the internal gap between the mold elements at the portion of the mold corresponding to the main surface region of the foamed article or corresponding to the most important surface region of the foamed article.

The injection time for injecting the molten resin composition in the primary injection step of the process for producing foamed article according to the present invention should be at the most 1.5 seconds, preferably in the range from 0.2 to 1.2 seconds. By performing the primary injection of the molten resin composition within this injection time, a foamed article exhibiting scarce swirl mark can be obtained.

The injection of the molten resin composition in the primary injection step of the process for producing the foamed article should be effected while imposing a clamping pressure on the movable mold element in the range from 5 to 20 MPa, preferably from 7 to 17 MPa, with respect to the sectional area of the mold cavity in the projection onto the base plane of the mold. By performing the injection while imposing such a pressure on the movable mold element, a foamed article superior in the appearance can be obtained.

The temperature of the molten resin composition comprising preferably a polypropylene resin may favorably be in the range from 170 to 270° C., preferably from 180 to 260° C. The temperature of the stationary and movable mold elements may favorably be in the range from 10 to 100° C., preferably from 40 to 80° C.

Each injection of the molten resin composition may favorably be effected under an injection pressure in the range from 10 to 200 MPa, preferably from 12 to 150 MPa. The pressure in the mold cavity may favorably be in the range from 5 to 20 MPa, preferably from 10 to 15 MPa.

By performing the injection under an injection pressure higher than the clamping pressure imposed on the mold elements, the air retained in the mold cavity can smoothly be expelled by the introduced molten resin composition with fixedly settled movable mold element and occurrence of short shot is prevented.

For the injection molding machine to be used according to the present invention, high-speed injection machine may be preferable. Here, the maximum injection speed may be, in general, at least 80 mm/sec, preferably at least 100 mm/sec. and more preferably at least 120 mm/sec., though may be different according to the diameter of the cylinder and to the weight of the molded article.

Now, the description is moved to the secondary injection step. In the secondary injection step, the residual amount of the thermoplastic resin composition is further injected into the mold cavity under an injection pressure higher than the clamping pressure, while the movable mold element draws back by the pressing action of the injected molten resin composition from the position settled for the primary injection step, so as to increase the cavity volume successively. It is permissible to control the settling position of the movable mold element by a computer when the movable mold element draws back.

The velocity of drawing back of the movable mold element may favorably be controlled so as to be settled within a range from 0.1 to 10 mm/sec., preferably from 0.5 to 3 mm/sec. The injection conditions, such as the resin temperature, mold temperature, mold internal pressure and injection pressure, may favorably be the same as those in the primary injection step.

In the process for producing foamed article according to the present invention, it is favorable that the ratio of the least thickness of the mold cavity at the start of the primary injection ($L_0$, referred to in the following sometimes as the least clearance $L_0$) relative to the thickness of the mold cavity at the end of the secondary injection step ($L_1$, referred to in the following sometimes as the molded clearance $L_1$), namely, $L_0/L_1$ (referred to in the following sometimes as the clearance ratio $L_0/L_1$), is in the range from 0.3 to below 1, preferably from 0.3 to 0.7, more preferably from 0.4 to 0.7. When the clearance ratio $L_0/L_1$ is in the above range, a skin layer superior in the appearance can be built up easily in an efficient manner. In particular, when the clearance ratio $L_0/L_1$ is in the range from 0.3 to 0.7, especially from 0.4 to 0.7, a skin layer having uniform thickness can promptly be formed in the primary injection step, while a large temperature difference between the skin layer and the core part can be maintained until the start of the foaming step after the termination of the secondary injection step, so that a higher foaming expansion ratio can be realized together with easy production of foamed article exhibiting superior appearance.

The time period from the start of injection of the molten resin composition in the primary injection step to the termination of injection in the secondary injection step (referred to hereinafter as the total injection period) may favorably be in the range from 0.1 to 10 seconds, preferably from 0.5 to 3 seconds. The secondary injection step may favorably be effected succeeding directly to the primary injection step without cessation. Thus, the injection of the molten resin composition may preferably be carried out continuously over the primary and the secondary injection steps. In the primary and the secondary injection steps, the mold is held under a pressurized state by the injection pressure and the filling pressure, so that foaming of the resin composition may not or scarcely occur.

The mold clamping pressure imposed on the movable mold element in the secondary injection step may favorably be same or lower than the mold clamping pressure in the primary injection step. The secondary injection is performed usually under an injection pressure higher than the mold clamping pressure while causing the movable mold element to be drawn back by the action of the introduced molten resin composition so as to increase the cavity thickness corresponding to the introduced amount of the molten resin composition. The control of the cavity thickness may be realized so as to cause the movable mold element to be drawn back passively when the clamping pressure yields to the injection pressure or, alternatively, by controlling the rate of variation of the cavity thickness actively. The drawing back velocity of the movable mold element may favorably be controlled within the range from 0.1 to 10 mm/sec., preferably from 0.5 to 3 mm/sec.

Now, the foaming step is described. Here, the secondary injection of the molten resin composition is stopped and the movable mold element is caused to further draw back so as to permit the thermoplastic resin composition to foam up. During the foaming step, the mold cavity is held under reduced pressure, since the movable mold element is moved back while the injection of the resin composition is stopped, so that the resin composition containing a foaming agent is permitted to foam up. Here, the surface layer of the introduced resin mass contacting with cool internal surface of the metal mold will not or scarcely cause foaming due to its lower temperature but will remain as such to build up the skin layer. The internal core part of the resin mass introduced into the mold cavity will be permitted to foam up by the pressure relief to build up foam layer (core part). This foaming molding is called core back molding. The mold cavity thickness $L_2$ defined by the mold elements in which the movable mold element is at its maximum drawn back position is referred to in the following sometimes as the maximum clearance $L_2$.

The drawing back velocity of the movable mold element may favorably be in the range from 0.1 to 10 mm/sec., preferably from 0.5 to 3 mm/sec. In general, the foaming mold temperature is the same as that of the injection step. The time period from the start to the end of drawing back of the movable mold element in the foaming step (referred to hereinafter sometimes as the foaming time) may favorably be in the range from 0.1 to 5 seconds, preferably from 0.5 to 3 seconds. By employing such conditions for the foaming step, foamed articles exhibiting better appearance can be obtained easily in an efficient manner.

The drawing back of the movable mold element may be effected succeedingly from the secondary injection step, wherein the drawing back of the movable mold element may be stopped for a while of 0 to 5 seconds, preferably 0.5 to 3 seconds, after the termination of the secondary injection step (after the termination of the injection), before recommencement of the drawing back of the movable mold element. By adjusting the time period of cessation of drawing back of the movable mold element, the thickness of the skin layer of the foamed article can be controlled. Thus, the skin layer thickness can be increased by increasing the time of the cessation. When the skin layer thickness is increased, the mechanical properties, such as the impact resistance etc., can be increased.

The time point of the termination of drawing back movement of the movable mold element can be determined in accordance with each contemplated foaming expansion ratio. Thus, foamed articles of higher expansion ratio can be produced by choosing longer receding distance. The foaming expansion ratio may favorably be in the range from 1.05 to 5 times, preferably from 1.3 to 2 times the non-foamed original volume, though there is no limitation in the expansion ratio.

In a foaming molding, adjustment of the expansion ratio is, in general, difficult, since the core part of the foamed molded mass is cooled only inefficiently and the skin layer is cooled promptly. It is possible, however, to increase the foaming expansion ratio and to obtain foamed articles exhibiting better appearance without deformation and distortion, by performing the injection foaming molding by the procedures given above under the stated conditions using the thermoplastic resin composition as the raw material.

After termination of foaming, the molded foamed mass may be cooled spontaneously to obtain the final foamed article or, alternatively, may be cooled for 0 to 60 seconds, preferably for 1 to 10 seconds, followed by compression of the foamed molded mass by forwarding the movable mold element to some extent to adjust the final size of the foamed article. By incorporation of compression of the foamed molded mass, it is possible to cause the surfaces which are not in contact with the inner face of the mold cavity to bring into contact with the inner face of the mold cavity again, whereby the efficiency of cooling of the molded article is increased. By confining the molded article to a definite configuration by the compression, an advatageous effect of restricting distortion of the final foamed article can be attained with simultaneous effect of better appearance.

As mentioned previously, it is possible according to the present invention to obtain a foamed article having a skin layer exhibiting better appearance without swirl mark, that is by effecting the primary injection into the mold cavity of the least clearance $L_0$ established with the movable mold element fixed at a definite position within a definite injection time. In particular, a foamed article with a superior appearance can be produced efficiently, when a raw resin having a definite MFR value as mentioned above is used and a clearance ratio $L_0/L_1$ in the range from 0.3 to 0.7, preferably from 0.4 to 0.7 is selected. Further, by the process according to the present invention, the interval of foaming molding cycle can be reduced and a foamed article of high forming expansion ratio can be obtained efficiently.

The foamed article of thermoplastic resin composition produced by the process according to the present invention has a skin layer having a thickness in the range from 0.1 to 0.7 mm, preferably from 0.3 to 0.6 mm, without swirl mark together with better foam cell configuration with relatively uniform cell size and better external appearance. Therefore, foamed articles according to the present invention can be installed for interior and exterior furnishings of automobile for which importance is attached to the external appearance.

The foamed article according to the present invention is superior in the surface characteristics and also excellent in the stiffness despite of light weight. It permit easy recycled reclamation. Thus, foamed articles according to the present invention may be used favorably not only for interior furnishings of automobile, such as door trim, instrument panel and so on, but also for external parts of automobile, such as side protect mole, bumper, soft fascia, mud guard etc.

As described above, the present invention provides a process for producing a foamed article of a thermoplastic resin composition having a skin layer and a core part both made of one and the same thermoplastic resin composition, in which a foamed article of light weight superior in the stiffness having a foam structure with better foam cell configuration with relatively uniform cell size can be produced, wherein the said process comprises a step of injecting a part amount of the thermoplastic resin composition into a mold cavity defined by a stationary mold element and a movable mold element in which the least mold thickness $L_0$ is in the range from 1.0 to 1.5 mm and the cavity volume is smaller than the total volume of the raw resin mass necessary for making up the complete foamed article, while holding the movable mold element fixedly and while imposing a clamping pressure in the range from 5 to 20 MPa onto the movable mold element for an injection duration of 1.5 seconds or less. It is possible to produce a foamed article of a thermoplastic resin composition having a thicker skin layer at a higher foaming expansion ratio easily and efficiently. Here, it is able to form a skin layer exhibiting no flow mark, such as swirl mark, easily, so that a foamed article superior in the appearance can be produced easily and efficiently.

THE BEST MODE FOR EMBODYING THE INVENTION

In the following, the present invention will be described in more detail with reference to the drawings appended. As shown in FIGS. 1(*a*), 1(*b*) and 1(*c*), the process according to the present invention is proceeded in the sequence of FIG. 1(*a*) to FIG. 1(*c*).

FIG. 1(*a*) illustrates schematically the state of the mold in which the stationary mold element 1 and the movable mold element 2 define a mold cavity 3 held at the most closest distance from each other and the cavity is in the smallest space. Here, the volume of the mold cavity 3 is settled to be smaller than the total volume of the thermoplastic resin necessary for making up the complete foamed article and the thickness of the mold cavity is at its least thickness $L_0$ which may be in the range from 1.0 to 1.5 mm.

A molten thermoplastic resin composition 5 is injected into the mold cavity 3 settled at the least mold thickness $L_0$ through an injection nozzle (not shown) via a sprue 4 so as to fill up the mold cavity with the molten thermoplastic resin composition 5 within a time period of 1.5 seconds (the primary injection step). The clamping pressure imposed on the movable mold element may be in the range from 5 to 20 MPa with respect to the sectional area of the mold cavity in the projection onto the base plane of the mold. The injection of the molten thermoplastic resin composition 5 may favorably be carried out under an injection pressure higher than the clamping pressure imposed on the movable mold elements 2, wherein the air retained in the mold cavity 3 can be expelled out by the action of the molten resin composition rushed thereinto even if the movable mold element 2 is held fixed. In the primary injection step, the mold cavity 3 confined to a small space is filled promptly up to peripheral portions with the thermoplastic resin composition 5 while being chilled on the cool inner face of the mold cavity to form a skin layer of better appearance having a uniform thickness.

Then, the secondary injection step is carried out under an injection pressure higher than the clamping pressure imposed on the mold elements, while drawing back the movable mold element 2 by the pressure difference to increase the volume of the mold cavity 3 until the amount of the molten thermoplastic resin composition 5 of the batch has been injected into the mold cavity 3 (the secondary injection step is over). FIG. 1(*b*) illustrates this state of the mold in which the thickness of the mold cavity 3 is at the molded clearance $L_1$. In this state, the volume of the cavity 3 is held at a value higher than the cavity volume shown in FIG. 1(*a*), namely, the least clearance $L_0$ is smaller than the molded thickness ($L_0<L_1$). The clearance ratio $L_0/L_1$ may favorably be 0.3 or higher but less than 1, preferably in the range from 0.3 to 0.7, more preferably from 0.4 to 0.7.

At the occasions as shown in FIGS. 1(*a*) and 1(*b*), the thermoplastic resin composition 5 is held in a yieldable soft state but nevertheless it does not or only scarcely foam up due to the imposed injection pressure and the filling pressure.

Thereafter, the foaming step is carried out while the movable mold element 2 is further drawn back. The mold cavity 3 will thereby be under a reduced pressure, whereby the thermoplastic resin composition 5 is caused to foam up. A foamed mass (core part) is produced, the state of which is illustrated in FIG. 1(*c*). The thickness of the mold cavity 3 is at its maximum clearance $L_2$, at which the volume of the mold cavity 3 is increased as compared with that shown in FIG. 1(*b*) with $L_1<L_2$.

After termination of foaming, the molded foamed mass may be stood still to cool spontaneously to obtain the final foamed article 6 or, alternatively, may be processed by forwarding the movable mold element to subject the foamed mass to a compressing action.

By the process for producing foamed article according to the present invention as described above, a foamed article having a skin layer and a core part both made of one and the same thermoplastic resin composition in which occurrence of swirl mark is excluded and which is light-weighing and superior in the stiffness and in the surface characteristics and has a foam structure with better foam cells can be produced with higher foaming expansion ratio easily and efficiently.

Below, the present invention is described by way of Examples.

EXAMPLE 1

100 parts by weight of a polypropylene resin consisting of a block copolymer having a propylene content of 94 mole %, an ethylene content of 6 mole %, a density of 0.902 g/cm$^3$, an MFR, determined according to ASTM D 1238 at 230° C. under a load of 2.16 kg, of 80 g/10 min., an Mw/Mn value, determined by gel permeation chromatography (GPC) with conversion into a standard polystyrene value, of 4.1, an Mz/Mw value of 3.3 and an isotactic pentad fraction determined by $^{13}$C-NMR of 97.8% were mixed with 1.8 parts by weight of a foaming agent master batch (composed of 25% by weight of sodium bicarbonate, 25% by weight of citric acid and 50% by weight of a low density polyethylene) by dry-blending to obtain a polypropylene resin composition. The MFR of the residual mass of the above polypropylene resin composition deprived of the sodium bicarbonate and the citric acid, determined according to ASTM D 1238 at 230° C. under a load of 2.16 kg, was found to be 79 g/10 min.

A pelletized product of the above polypropylene resin composition was injection-molded under the conditions as given below to obtain a foamed article. Thus, 50% by weight of the above polypropylene resin composition were subjected to a primary injection into the mold cavity of an injection molding machine at a least clearance of the mold cavity of 1.0 mm settled on the start of the primary injection for an injection duration of 0.4 second. Then, the remaining amount of the polypropylene resin composition was injected into the mold cavity while drawing back the movable mold element until a molded clearance of 1.8 mm was reached for an injection time of 0.3 second, whereupon the so-injected mass of the polypropylene resin composition was permitted to foam up by receding the movable mold element further to the maximum clearance of 3.0 mm to obtain a foamed article. The resulting foamed article was examined for its material properties, the results of which are recited in Table 1.

Molding Condition 1
  Injection Molding Machine:
    Model MD 850S-IIIDP (trademark, supplied from the firm Ube Machinery Industries)
    Size of the Resulting Foamed Article:
    a flat board of 80 cm length, 50 cm width and varying thickness.
    Construction of the Gate:
    valve gate (single gate at the center of the molded article)
    Injection Temperature:
    200° C.
    Clamping Pressure on the Mold:
    7.5 MPa during the primary injection step
    4.5 MPa during the secondary injection step
    Injection Pressure:
    100 MPa
  Injection Time:
    0.4 second for the primary injection
    0.3 second for the secondary injection
    Foaming Time:
    1.0 second
    Mold Surface Temperature:
    50° C.
    Drawing Back Velocity of the Movable Mold Element in the Secondary Injection Step:
    3.3 mm/sec.
    Time of Cessation of Drawing back Movement After the Secondary Injection Step:
    2.0 seconds
    drawing Back Velocity of the Movable Mold Element in the Foaming Step:
    1.0 mm/sec.
    Least Clearance $L_0$ of the Mold Cavity on the Primary Injection Step:
    1.0 mm
    Molded Clearance $L_1$ of the Mold Cavity After the Secondary Injection Step:
    1.8 mm
    Maximum Cearance $L_2$ of the Mold Cavity After the Foaming Step:
    3.0 mm
    Cooling Time:
    30 seconds
In the conditions given above, the cooling time represents the time from the termination of drawing back movement of the movable mold element until taking out of the foamed article from the mold in the foaming step.

COMPARATIVE EXAMPLE 1

Core Back Injection

The procedures of Example 1 were pursued except that the injection molding conditions were changed to those given below. Thus, the least clearance $L_0$ of the mold cavity was settled to be 1.8 mm and the entire amount of the polypropylene resin composition was injected in one step at the least clearance $L_0$ of 1.8 mm, whereupon the foaming step was effected after the injection by drawing back the movable mold element to 3.0 mm cavity thickness. The cooling time was settled at 60 seconds. The results are recited also in Table 1.

EXAMPLE 2

The procedures of Example 1 were pursued except that the least clearance $L_0$ of the mold cavity was settled to be 1.2 mm, the molded clearance $L_1$ after the secondary injection step was settled to be 1.8 mm and the maximum clearance $L_2$ after the foaming step was settled to be 3.6 mm. The results are recited also in Table 1.

EXAMPLE 3

The procedures of Example 1 were pursued except that a polypropylene resin having a propylene content of 100 mole %, a density of 0.905 g/cm$^3$, an MFR value, determined according to the ASTM D 1238 at 230° C. under a load of 2.16 kg, of 60 g/10 min., an Mw/Mn value, determined by GPC with conversion into standard polystyrene value, of 4.2, an Mz/Mw value of 3.4 and an isotactic pentad fraction determined by $^{13}$C-NMR of 97.8%, was used. The results are recited also in Table 1.

COMPARATIVE EXAMPLE 2

The procedures of Example 1 were pursued except that the injection time in the primary injection step was changed to 2.0 seconds and the injection duration in the secondary injection step was changed to 2.0 seconds. The results are recited in Table 1.

COMPARATIVE EXAMPLE 3

The procedures of Example 1 were pursued except that the clamping pressure in the primary injection step was changed to 30 MPa. The results are recited in Table 1.

REFERENCE EXAMPLE 1

The procedures of Example 1 were pursued except that the foaming agent master batch was not used and the molded article which was not foamed was taken out of the mold after the molded mass was cooled for 30 seconds after the secondary injection step.

TABLE 1

| | Example | | | Comp. Example | | |
|---|---|---|---|---|---|---|
| | 1 | 2 | 3 | 1 | 2 | 3 |
| Least clearance $L_0$ (mm) | 1.0 | 1.2 | 1.0 | 1.8 | 1.0 | 1.0 |
| Injection duration in injection step 1 (sec.) | 0.4 | 0.4 | 0.4 | 0.8 | 2.0 | 0.6 |
| Compress. pressure imposed on the mold (MPa) | 7.5 | 7.5 | 7.5 | 7.5 | 7.5 | 30 |
| Foaming expansion ratio (times) *1) | 1.6 | 1.9 | 1.6 | 1.7 | 1.4 | 1.2 |
| Thickness of the solid skin layer (mm) | 0.4 | 0.38 | 0.45 | 0.25 | 0.5 | 0.48 |
| Occurrence of swirl mark *2) | ⊙ | ⊙ | ⊙ | X | X | Δ |
| Injection performance *3) | ○ | ○ | ○ | ○ | ○ | X |

Notes:
*1): Foaming expansion ratio in times the non-foamed original volume, determined by detecting the specific gravities of non-foamed resin mass (dc0) and of the foamed resin mass (dc1) by water-displacement method and calculating the ratio dc0/dc1. The specific gravity of the foamed mass was observed for entire mass including the skin layer.
*2): Occurrence of swirl mark was assessed by visual observation of the surface of the foamed article by the following assessment criterion:
⊙: Almost no swirl mark is observed and comparable to the non-foamed product (Reference Example 1).
○: Swirl mark is visible slightly at peripheral portion.
Δ: Swirl mark is seen slightly over the surface.
X : Swirl mark is seen over the entire surface.
*3): Injection performance was assessed by the following criterion:
○: No reduction in the injection velocity was observed during the injection and a smooth injection was possible.
X: An increase in the injection pressure occurred, whereby the injection velocity was reduced.

What is claimed is:

1. A process for producing a foamed article of a thermoplastic resin composition by causing the resin composition to foam up in a cavity of a mold, comprising a primary injection step in which a part amount of the thermoplastic resin composition is injected into the mold cavity defined by a stationary mold element and a movable mold element settled at a position confining the mold cavity to a smaller volume than the total volume of the thermoplastic resin composition necessary for making up the complete foamed article, while imposing a clamping pressure on the movable mold element so as to settle it at the position, a secondary injection step, subsequent to the primary injection step, in which the residual amount of the thermoplastic resin composition is further injected into the mold cavity, while drawing the movable mold element back from the position settled for the primary injection step so as to increase the cavity volume, and a foaming step subsequent to the secondary injection step, in which injection of the thermoplastic resin composition is stopped and the movable mold element is further drawn back so as to permit the thermoplastic resin composition to foam up, wherein the thickness $L_0$ of the mold cavity at the start of the primary injection step is in the range from 1.0 to 1.5 mm, the injection time of the primary injection step is 1.5 seconds or less and the pressure imposed on the movable mold element in the primary injection step is in the range from 5 to 20 MPa with respect to the sectional area of the mold cavity in the projection onto the mold base plane and wherein the ratio of the thickness $L_0$ of the mold cavity at the start of the primary injection step relative to the thickness $L_1$ at the end of the secondary injection step, namely, $L_0/L_1$, is in the range from 0.3 to 1.0.

2. The process of claim 1, wherein the drawing back of the movable mold element during the foaming step begins within 5 seconds from the termination of the secondary injection step.

3. The process of claim 1, further comprising compressing the foamed article by pressing the movable mold element onto the foamed article within 60 seconds from the termination of the foaming step.

4. The process of claim 2, further comprising compressing the foamed article by pressing the movable mold element onto the foamed article within 60 seconds from the termination of the foaming step.

5. The process of claim 1, wherein the thermoplastic resin composition comprises a polyolefin resin and a foaming agent.

6. The process of claim 4, wherein the thermoplastic resin composition comprises a polyolefin resin and a foaming agent.

7. The process of claim 5 wherein the polyolefin resin is a polypropylene resin.

8. The process of claim 6 wherein the polyolefin resin is a polypropylene resin.

9. The process of claim 5, wherein the polyolefin resin has a melt flow rate, determined according to ASTM D 1238 at 230° C. under a load of 2.16 kg, in the range of from 30 to 200 g/10 mm.

10. The process of claim 6, wherein the polyolefin resin has a melt flow rate, determined according to ASTM D 1238 at 230° C. under a load of 2.16 kg, in the range of from 30 to 200 g/10 mm.

* * * * *